(12) United States Patent
Valentine et al.

(10) Patent No.: US 8,591,849 B2
(45) Date of Patent: Nov. 26, 2013

(54) ON DEMAND GENERATION OF AMMONIA FOR SMALL INDUSTRIAL AND COMMERCIAL BOILERS

(71) Applicants: James M. Valentine, Fairfield, CT (US); Jeffrey Michael Broderick, Ridgefield, CT (US); Scott H. Lindemann, Oxford, CT (US); R. Gifford Broderick, Wilton, CT (US); Edmund S. Schindler, Fairfield, CT (US)

(72) Inventors: James M. Valentine, Fairfield, CT (US); Jeffrey Michael Broderick, Ridgefield, CT (US); Scott H. Lindemann, Oxford, CT (US); R. Gifford Broderick, Wilton, CT (US); Edmund S. Schindler, Fairfield, CT (US)

(73) Assignee: Combustion Components Associates, Inc., Monroe, CT (US)

( * ) Notice: Subject to any disclaimer, the term of this patent is extended or adjusted under 35 U.S.C. 154(b) by 0 days.

(21) Appl. No.: 13/863,956

(22) Filed: Apr. 16, 2013

(65) Prior Publication Data
US 2013/0272940 A1 Oct. 17, 2013

Related U.S. Application Data

(60) Provisional application No. 61/624,750, filed on Apr. 16, 2012.

(51) Int. Cl.
*B01D 53/56* (2006.01)
*B01D 53/74* (2006.01)
*B01D 53/76* (2006.01)

(52) U.S. Cl.
USPC ......... 423/239.1; 422/105; 422/168; 422/177

(58) Field of Classification Search
USPC ................ 423/239.1; 422/105, 168, 177
See application file for complete search history.

(56) References Cited

U.S. PATENT DOCUMENTS

| | | | |
|---|---|---|---|
| 5,296,206 A | 3/1994 | Cho et al. | |
| 5,968,464 A | 10/1999 | Peter-Hoblyn et al. | |
| 6,203,770 B1 | 3/2001 | Peter-Hoblyn et al. | |
| 6,322,762 B1 | 11/2001 | Cooper et al. | |
| 6,361,754 B1 | 3/2002 | Peter-Hoblyn et al. | |
| 6,436,359 B1 | 8/2002 | Spencer, III et al. | |
| 7,090,810 B2 | 8/2006 | Sun et al. | |
| 7,467,749 B2 | 12/2008 | Tarabulski et al. | |
| 7,588,440 B2 * | 9/2009 | Smith | 431/4 |
| 7,815,881 B2 | 10/2010 | Lin et al. | |
| 2004/0120872 A1 * | 6/2004 | Fan et al. | 423/239.1 |
| 2012/0177553 A1 | 7/2012 | Lindemann et al. | |

* cited by examiner

*Primary Examiner* — Timothy Vanoy
(74) *Attorney, Agent, or Firm* — St. Onge Steward Johnston & Reens LLC

(57) ABSTRACT

A system and method for reducing NOx emissions from a lean burn combustion source is provided. The system includes a blower passing air through a continuous duct having a hot portion and a reaction portion. The hot portion of the duct is positioned in the convective zone of the combustion source to heat the passing air for the reaction portion of the duct. An injector attached to a urea storage container is positioned in the reaction portion of the duct and sprays urea from the storage container into the heated air in the reaction duct for evaporation and decomposition into ammonia gas. The ammonia gas is then supplied to an injection grid in the exhaust duct of the lean burn combustion source upstream of a NOx reduction catalyst. The injection grid supplies the ammonia gas to the exhaust gas in the exhaust duct.

33 Claims, 8 Drawing Sheets

ON DEMAND GENERATION OF AMMONIA FOR SMALL INDUSTRIAL AND COMMERCIAL BOILERS

This application claims benefit of the filing date of the U.S. Provisional Application No. 61/624,750 filed on Apr. 16, 2012.

FIELD OF THE INVENTION

The present invention relates generally to the reduction of oxides of nitrogen (NOx) emissions produced in industrial and commercial boilers. In particular, the present invention provides methods and apparatus for the on demand generation of ammonia from small quantities of aqueous urea solution without the requirement for supplemental burners, heaters or electric coils and without the need for storage of ammonia. The small quantity of ammonia generated is injected into the primary exhaust gas stream within a second or less. The present invention provides a safe and cost effective solution for ammonia generation from urea and is ideally suited for selective catalytic reduction (SCR) applications on small industrial and commercial boilers or other small lean burn combustion sources with a need to reduce nitrogen oxide emissions.

BACKGROUND OF THE INVENTION

Small industrial and commercial boilers are widely used for heat and/or steam by universities, hospitals, commercial offices, apartments, food production plants, refineries and other industrial facilities. Estimates put the number of these boilers at over 160,000 units in the United States and the industry reports that several hundred new industrial and commercial boilers are installed each year. Unlike large utility boilers that often fire coal to produce high temperature steam to drive a turbine and generator for electric power production, these boilers produce low temperature and low-pressure steam and are generally fueled by natural gas or petroleum derived fuels, and in some cases fuel derived from biomass.

Regulations at the state and federal level are directed at reducing the emissions of nitrogen oxides from mobile and stationary sources including industrial and commercial boilers. In certain areas that have failed to meet attainment for ambient ozone or NOx standards these small boilers are required to reach emission levels as low as 9 parts per million (ppm) or even 5 ppm or less in the exhaust gas.

These low levels of emissions will require the use of ultra low NOx burners which are designed to tightly control the air, fuel and flue gas recirculation (FGR) rates. The result is to lower the oxygen content and temperature of combustion and reduce NOx emissions. High levels of FGR are required to achieve low NOx emissions and involve large fans capable of handling high volumes of hot flue gas. These fans consume large quantities of electric power to run their motors. The burners can be run more efficiently if allowed to operate at NOx levels above 15 ppm or even above 25 ppm and after treatment technology such as selective catalytic reduction (SCR) is used to reduce NOx emissions to levels below 10 ppm and even as low as 3 ppm or less.

One traditional after treatment approach to controlling NOx emissions involves the use of ammonia based SCR systems in which ammonia gas is introduced into the exhaust of a boiler upstream of a catalyst that chemically converts NOx to elemental nitrogen in the presence of ammonia. A difficulty with this approach is that the transport, handling and storage of ammonia often involves compliance with hazardous regulations. Due to the safety and health concerns, as well as the strict regulations, many small industrial and commercial institutions have restrictions on the presence of ammonia, making it unsuitable especially for applications such as hospitals, schools, food processors, office buildings and apartment buildings.

An alternative approach to the use of ammonia for SCR involves the use of urea solutions. Urea decomposes to byproducts including ammonia at temperatures above 400 F but the rate and completeness of the conversion to ammonia depends on factors such as temperature, residence time, injection technique, and droplet size. In aqueous solutions of urea the water must be vaporized and the urea decomposed and converted to ammonia prior to the catalyst. This requires greater design and operating care than the simple vaporization of aqueous ammonia.

However, use of the aqueous urea solution involves many disadvantages. For instance, urea is highly corrosive and attacks mechanical components of the SCR systems. Urea also tends to solidify upon prolonged exposure to high temperatures and the solidified urea will accumulate. Therefore, unconverted urea can foul reactor vessels, downstream ductwork, heat exchanger equipment and the SCR catalyst.

Furthermore, many industrial and commercial boilers have outlet gas temperatures only slightly above 500 F at a full load conditions and at lower loads the exhaust temperature can be below 400 F. This is generally too low for successful use of urea as a reagent. Additionally the residence time from the boiler outlet to a downstream SCR catalyst can be so short that the urea injected into the exhaust after the boiler outlet is not fully vaporized and decomposed to ammonia before reaching the catalyst.

While injection of urea into a higher temperature zone of a fire tube boiler has been demonstrated to provide conversion of urea to ammonia for SCR, as described in U.S. patent application Ser. No. 13/313,683 (Injector and Method for Reducing NOx Emissions from Boilers, IC Engines and Combustion Processes), the injection of urea directly into the furnace of a water tube boiler for SCR applications is not practical due to the tight tube spacing in the furnace convective zone which prevents adequate distribution of the reagent into the furnace gases. Urea deposition on boiler tube surfaces and corrosion of water wall surfaces in the boiler is also a concern with direct injection into a furnace.

There have been several attempts to overcome the disadvantages of known urea based NOx reduction systems. For example, U.S. Pat. No. 7,815,881 to Lin et al. describes the use of a flue gas bypass duct for injection of urea and for conversion to ammonia for SCR. U.S. Pat. No. 7,090,810 to Sun et al. describes the reduction of NOx from large-scale combustors by injecting urea into a side stream of gases with temperature sufficient for gasification and a residence time of 1-10 seconds.

However, the patents of Lin and Sun appear directed at large utility boilers. Utility boilers normally have sufficient heat input, flue gas temperatures and furnace residence times to generate 50 MW or more of electric power and are typically rated at 100 MW-800 MW or more. Whereas most industrial commercial boilers are rated below 300 million Btu/hour heat input, or roughly 30 MW equivalent.

Additionally, U.S. Pat. No. 5,296,206 to Cho et al. describes a process directed at large utility boilers, which achieves reagent flow rates up to 3,000 lbs/hr using a heat exchanger disposed in the flue gas pass such that a heated transfer medium is used to vaporize an aqueous reducing agent, which is preferably aqueous ammonia. However, Cho requires the use of a separate vaporizer vessel where the aqueous solution and heated air are mixed at the top of the vessel and the preferred outlet temperature is 250 F-500 F. The vaporization vessel of Cho represents an additional expensive piece of equipment that can be prone to plugging from the incomplete decomposition of urea, especially at the described low exit temperatures of 250-500 F described by Cho.

Due to their smaller size and generally lower baseline NOx emissions, the cost per ton of pollutant removed from an industrial boiler can be extremely high when control technologies such as those of Sun, Lin and Cho, which are designed for large utility boilers, are applied to small industrial and commercial boilers.

Other commercial processes for the conversion of urea to ammonia involve the use of supplemental heaters, burners or high temperature steam to provide heat for conversion of urea to ammonia and they often involve a separate storage vessel to hold the ammonia gas. U.S. Pat. No. 6,436,359 to Spencer and U.S. Pat. No. 6,322,762 to Cooper generally describe generating ammonia by heating urea under pressure. These systems can be complicated to control, require additional power to operate the heaters and are expensive relative to the cost of a small industrial or commercial boiler.

U.S. Pat. Nos. 5,968,464 and 6,203,770 to Peter-Hoblyn et al. describe the proposed conversion of urea to ammonia in the exhaust of a diesel engine by injecting urea onto the heated surfaces of a pyrolysis chamber mounted in the exhaust. The pyrolysis chamber is presented in the figures and described as a foraminous structure of sintered metal, glass or ceramic material inserted in the flue gas such that when urea is injected into the structure it is converted to ammonia which then exits the foraminous structure and mixes in the flue gas. However, this structure will quickly plug with unconverted urea byproducts. In U.S. Pat. No. 6,361,754 to Peter-Hoblyn et al. it is described to convert the urea solution to ammonia by injecting the urea into a heated line disposed within an exhaust pipe, with an optional heated vessel, and then releasing ammonia through a valve mechanism into the exhaust gases upstream of an SCR reactor. However, urea solution pumped into a small heated line would be prone to plugging of the line from urea decomposition products, which would present significant resistance to the continuing flow of urea solution through the line.

Therefore, what is needed is a simple and efficient method of converting small quantities of urea to ammonia without the need for secondary heaters and without the need for secondary storage of ammonia.

SUMMARY OF THE INVENTION

It is an objective of the present invention to provide a system and method for reducing NOx emissions from a lean burn combustion source.

These and other objectives are achieved by providing a method for reducing NOx emissions from a lean burn combustion source, including the steps of providing an injection grid in an exhaust duct of a lean burn combustion source upstream of a NOx reduction catalyst, providing a continuous duct between an air intake and the injection grid, the continuous duct having a hot portion and a reaction portion, the reaction portion connected to the injection grid, passing air from the air intake through the continuous duct, at least a portion of the hot portion of the continuous duct positioned in a convective zone of the lean burn combustion source, the hot portion of the duct having a first average cross-sectional area perpendicular to the passing air, the hot portion of the duct supplying heated air to the reaction portion, the reaction portion having a second average cross-sectional area perpendicular to the passing air, positioning at least one injector in the reaction portion, supplying aqueous urea solution from a storage chamber to the at least one injector, injecting the urea into the heated air in the reaction portion for evaporation and decomposition into ammonia gas, supplying the ammonia gas to the injection grid, injecting the ammonia gas into the exhaust duct, wherein the second average cross-sectional area of the reaction portion of the duct is the same or greater than the first average cross-sectional area of the hot portion of the duct.

In some embodiments, the urea has a residence time of less than 1 second measured from when the urea is injected into the reaction portion of the duct to when the ammonia gas is injected into the exhaust duct.

In some embodiments, the urea has a residence time of less than 0.6 seconds measured from when the urea is injected into the reaction portion of the duct to when the ammonia gas is injected into the exhaust duct.

In certain embodiments, the convective zone has a hot end and a cold end and the hot portion of the duct enters the convective zone at the hot end and exits the convective zone at the cold end.

In still other embodiments, the convective zone has a hot end and a cold end and the hot portion of the duct enters and exits the convective zone at either the hot end or the cold end.

In some embodiments, the convective zone has a hot end and a cold end and the hot portion of the duct is looped through either the hot end or cold end.

In some embodiments, the hot portion of the duct enters and exits a position in the convective zone having a temperature between 700 and 1800 degrees Fahrenheit.

In certain embodiments, the passing air in the hot portion of the duct is between 50 and 1500 standard cubic feet per minute.

In still other embodiments, the passing air in the hot portion of the duct is between 150 and 300 standard cubic feet per minute.

In some embodiments, the heated air supplied to the reaction portion of the duct is between 450 and 1000 degrees Fahrenheit.

In some embodiments, the heated air supplied to the reaction portion of the duct is between 600 and 750 degrees Fahrenheit.

In certain embodiments, the hot portion of the duct enters a first position in the convective zone having a temperature between 500 and 1800 degrees Fahrenheit and the hot portion of the duct exits a second position in the convective zone having a temperature between 500 and 1800 degrees Fahrenheit.

In still other embodiments, the hot portion of the duct enters a first position in the convective zone having a temperature between 700 and 1600 degrees Fahrenheit and the hot portion of the duct exits a second position in the convective zone having a temperature between 700 and 1600 degrees Fahrenheit.

In some embodiments, the reaction portion of the duct is positioned outside the convection zone of the lean burn combustor and the urea solution is injected into the reaction portion of the duct at a rate between 0.1 and 10 gallons/hour.

In some embodiments, the reaction portion of the duct is positioned outside the convection zone of the lean burn combustor and the urea solution is injected into the reaction portion of the duct at a rate between 0.05 and 5 gallons/hour.

In certain embodiments, the urea is injected into the reaction portion of the duct using a single fluid return flow solenoid actuated injector.

In certain embodiments, the single fluid return flow solenoid actuated injector has air assistance for atomization.

In other embodiments, the hot portion of the duct has a diameter between 1 and 4 inches.

In other embodiments, the reaction portion of the duct has a diameter between 4 and 16 inches.

In some embodiments, a secondary heat source is positioned in the hot portion of the duct to further heat the passing air.

In some embodiments, the second average cross-sectional area of the reaction portion of the duct is no greater than five times the first average cross-sectional area of the hot portion of the duct.

In certain embodiments, the second average cross-sectional area of the reaction portion of the duct is no greater than three times the first average cross-sectional area of the hot portion of the duct.

Other objectives are achieved by further providing a method for reducing NOx emissions from a lean burn combustion source, including the steps of passing air through a continuous duct having a hot portion and a reaction portion, at least a portion of the hot portion of the duct positioned in a convective zone of a lean burn combustion source, the hot portion of the duct providing heated air to the reaction portion of the duct, positioning at least one injector in the reaction portion, supplying aqueous urea solution under pressure from a storage chamber to the at least one injector, injecting the urea into the heated air in the reaction portion for evaporation and decomposition into ammonia gas, providing an injection grid in the primary exhaust duct of the lean burn combustion source upstream of a NOx reduction catalyst, the injection grid connected to the reaction portion, supplying the ammonia gas to the injection grid, and injecting the ammonia gas into the primary exhaust duct.

In some embodiments, the urea has a residence time of less than 1 second measured from when the urea is injected into the reaction portion of the duct to when the ammonia gas is injected into the primary exhaust duct.

In some embodiments, the urea has a residence time of less than 0.6 seconds measured from when the urea is injected into the reaction portion of the duct to when the ammonia gas is injected into the exhaust duct.

In certain embodiments, the hot portion of the duct enters a first position in the convective zone having a temperature between 400 and 1800 degrees Fahrenheit and the hot portion of the duct exits a second position in the convective zone having a temperature between 400 and 1800 degrees Fahrenheit.

In other embodiments, the hot portion of the duct enters a first position in the convective zone having a temperature between 700 and 1600 degrees Fahrenheit and the hot portion of the duct exits a second position in the convective zone having a temperature between 700 and 1600 degrees Fahrenheit.

In other embodiments, the reaction portion of the duct is positioned outside the convection zone and the aqueous urea solution is injected into the reaction portion of the duct at a rate between 0.1 and 10 gallons/hour.

In some embodiments, the reaction portion of the duct is positioned outside the convection zone and the aqueous urea solution is injected into the reaction portion of the duct at a rate between 0.05 and 5 gallons/hour.

In some embodiments, the hot portion of the duct has a diameter between 1 and 4 inches.

In certain embodiments, the reaction portion of the duct has a diameter between 4 and 20 inches.

Still further provided is a system for reducing NOx emissions from a lean burn combustion source, including a blower, the blower providing forced air through a continuous duct having a hot portion and a reaction portion, at least a portion of the hot portion of the duct positioned in a convective zone of a lean burn combustion source, at least one injector in the reaction portion, a storage chamber for containing aqueous urea solution, the storage chamber fluidly connected to the at least one injector, a pump for passing the urea solution from storage to the injector, a control module to control the blower, pump and injector and an injection grid in an exhaust duct of the lean burn combustion source upstream of a NOx reduction catalyst, the injection grid connected to the reaction portion of the duct.

In some embodiments, the hot portion of the duct has a first average cross-sectional area perpendicular to the forced air and the reaction portion of the duct has a second average cross-sectional area perpendicular to the forced air, and the second average cross-sectional area of the reaction portion of the duct being the same or greater than the first average cross-sectional area of the hot portion of the duct.

DETAILED DESCRIPTION OF THE INVENTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an exemplary embodiment of the invention. It should be understood that various changes may be made in the function and arrangement of elements without departing from the spirit and scope of the invention as set forth in the appended claims.

Figure 1:
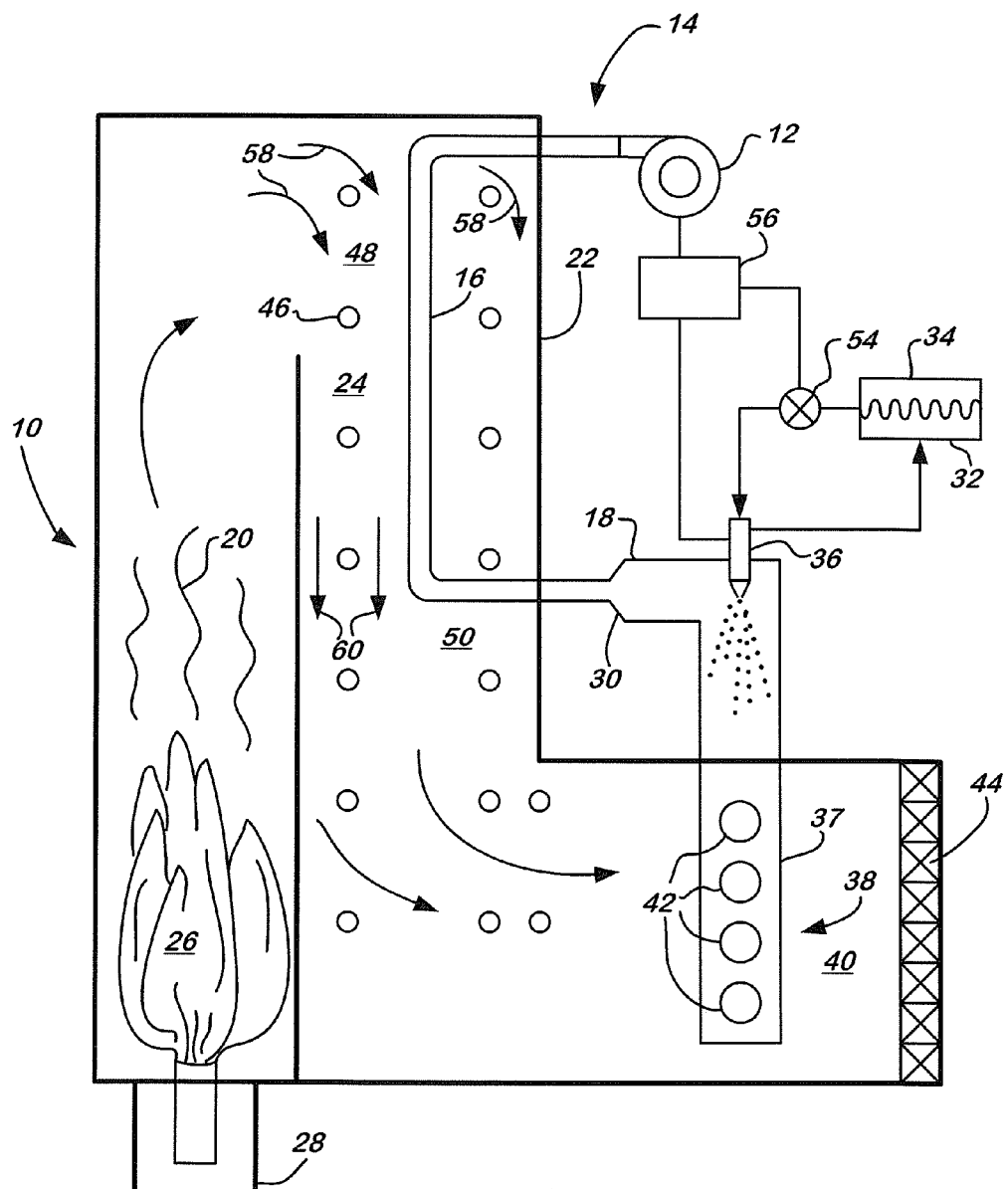
FIG. 1 is a schematic cross-sectional view of the present invention.

With reference to FIG. 1, the present invention is directed to the reduction of oxides of nitrogen (NOx) emissions produced in industrial and commercial boilers 10. The system includes a blower 12 which feeds air fed to a continuous duct 14 comprising at least a hot duct 16 and a reaction duct 18. The hot duct 16 is generally constructed of alloyed steel or other suitable materials to handle exhaust gas 58 temperatures of up to 1600 F-1800 F in the hot end 48 of the convective zone 24. The hot duct 16 is routed through the boiler wall 22 and into the boiler convective zone 24, away from the direct fire 26 of the burner 28 emitting exhaust gases 20. The exhaust gas 58 temperatures where the hot duct 16 is routed through the boiler wall 22 are generally in the range of 700 F-1800 F. Ambient air is blown through the hot duct 16 by the blower 12 and heated to a temperature above 600 F. Preferably the ambient air is heated to a temperature above 750 F and up to as high as 1000 F. The outlet end of the hot duct 16 is directed through the wall 22 of the boiler 10 and can be connected to an external transition duct 30 which directs the heated air to the reaction duct 18. The reaction duct 18 provides a continuous flow of heated air via the blower 12 through the hot duct 16. Preferably the transition duct 30 and reaction duct 18 are a greater diameter than the hot duct 16. The reaction duct 18 will generally be made of stainless steel and be resistant to corrosion from urea. Aqueous urea solution 32 is stored in a container 34 which is fluidly connected to an injector 36. A pump 54 circulates urea solution to the injector. A control module 56 controls the blower 12, pump 54 and injector 36. Urea solution is injected into the hot air flowing through the reaction duct 18 such that the water from the urea solution is evaporated and the urea is decomposed and converted into ammonia gas.

The reaction duct 18 is sized to provide a residence time of less than 1 second and more typically between 0.2-0.6 seconds. Preferably, the continuous duct 14 has a circular cross section and the diameter ratio between the reaction duct 18 and the hot duct 16 is no greater than 6:1 and more preferably no greater than 3:1. For instance, the diameter of the reaction duct 18 is no greater than 6 times that of the hot duct 16. More preferably, the diameter of the reaction duct 18 is no greater than 3 times that of the hot duct 16. In some cases the diameters of the reaction duct 18 and hot duct 16 are the same. It should be noted where the duct is not circular (for example square or rectangular) that the ratio between the reaction duct 18 and the hot duct 16 can also be measured by the cross-sectional area of the ducts.

In instances where the hot duct 16 and/or reaction duct 18 portions of the continuous duct 14 have varying shapes or cross-sectional areas along their length, the size ratio between the ducts can be measured by taking the average cross-sectional area over the length of each duct. The average cross-sectional area of the hot duct 16 can be determined by averaging the cross-sectional area of the hot duct 16 from where the hot duct 16 enters the boiler wall 22 to where the hot duct 16 exits the boiler wall 22. Similarly, the average cross-sectional area of the reaction duct 18 can be determined by averaging the cross-sectional area of the reaction duct 18 from where the reaction duct 18 is attached to the transition duct 30 to where the reaction duct 18 attaches to the AIG header 37. Alternatively, the average cross-sectional area of the reaction duct 18 can include the average cross-sectional areas of each portion of the continuous duct 14 from where the continuous duct 14 immediately exits the boiler wall 22, the transition duct 30 and the reaction duct 18 up to where the reaction duct 18 attaches to the AIG header 37.

The outlet of the reaction duct 18 is connected to a header 37 for an ammonia injection grid (AIG) 38. The AIG 38 is positioned in the primary exhaust duct 40 exiting from the boiler 10 and consists of a single or multiple horizontal or vertical lances 42 with multiple injection ports, outlet holes and/or nozzles on each lance 42. While AIG 38 design is known to those skilled in the art, the lances 42 and ports in the current invention are sized to handle the ammonia gas generated and the volume of flowing hot air. The blower 12 is sized to overcome the resistance to flow through the hot duct 16, the reaction duct 18 and the AIG 38. Ammonia gas is transported through the AIG 38 lances 42 by the air from the blower 12 and distributed in the boiler exhaust duct 40 upstream of the SCR catalyst 44. A mixer can be installed in the main exhaust duct 40 either before the AIG 38 or after the AIG 38 and upstream of the SCR catalyst 44 to assist with mixing and distribution of ammonia in the exhaust gas 20 before it reaches the SCR catalyst 44.

The injector 36 controls the rate of urea injection into the reaction duct 18 based on a load or fuel flow signal from the boiler 10 or from an outlet NOx sensor signal located after the SCR catalyst 44 or from a NOx sensor located before the catalyst 44 that measures NOx emissions from the boiler 10 prior to the AIG 38 to determine the quantity of reagent needed. A Programmable Logic Controller (PLC) 56, Dosing Control Unit (DCU) 56 or computer 56 is used to generate a control signal to the injector or metering pump 54 to adjust the rate of urea injection based on load, fuel flow, NOx or other signal.

The blower 12 preferably has a capacity of 100-350 scfm, and more preferably 150-300 scfm. As shown in FIG. 1, the blower 12 is connected to the inlet end of the continuous duct 14 external to the boiler 10 and is used to convey ambient air through the heat duct 16. Larger boilers and combustors will require higher air flows up to 750-1500 scfm depending on boiler size and the quantity of urea injection required. Blower size and horsepower will be selected by those skilled in the art to overcome the resistance to flow through the heat duct 16, reaction duct 18 and AIG 38.

The hot duct 16 is sized and configured to provide sufficient surface area inside the boiler 10 for the hot flue gases to heat the flowing air inside the hot duct 16 to the desired temperature of 650-750 F. In applications where there are significant changes in boiler firing rate and hence changing furnace gas temperatures, a supplemental electric heater or duct burner can be installed near the outlet end of the hot duct 16 outside the boiler wall to maintain the temperature of the flowing air within the 650-750 target range prior to the reaction duct 18.

The outlet of the hot duct 16 is connected to a transition duct 30 which is in turn connected to the reaction duct 18. The transition duct 30 and reaction duct 18 can be the same diameter or of different diameters from the hot duct 16. It is preferred that the reaction duct 18 is 4" to 12" in diameter and up to 24" diameter for larger combustors. The reaction duct 18 is generally 4' to 10' in length and is sized and located to give a residence time of less than 1 second, and preferably under 0.8 seconds, which is measured from the point of urea injection in the reaction duct 18 to the point of ammonia injection from the AIG 38 into the primary exhaust duct 40 under full load operating conditions. More preferably, the residence time will be less than 0.6 seconds.

The injector 36 is mounted at the inlet end of the reaction duct 18 and can be mounted axially or radially, to inject straight, perpendicular or angled relative to the gas flow. Injectors of the type described in U.S. Pat. No. 7,467,749 or U.S. patent application Ser. No. 13/313,683 are ideal but any low flow injector producing droplets in the 10-120 micron size range can be used. Both air assisted and non-air assisted injectors can be utilized either with or without return flow features.

The rate of injection is variable based on a load or fuel signal from the boiler which is processed by a PLC and used to adjust the injection rate of the injector. In the example of a 55,000 lbs/hr steam generator with 30 ppm of uncontrolled NOx measured at 3% excess oxygen in the exhaust at full load, an injection rate of 0.5-0.6 gallons per hour of 32% urea in an aqueous solution is injected at full load to reduce the NOx to less than 5 ppm. A typical range of injection rates for industrial and commercial boilers is 0.05-5.0 gallons per hour depending on the mass of uncontrolled NOx, the reduction required, and the operating load.

A mixer can be placed in the boiler exhaust duct 40 prior to the AIG 38 or the mixer can be located downstream of the AIG 38 but before the SCR catalyst 44 to insure mixing of the ammonia gas in the main exhaust gas 20.

An SCR catalyst 44 is preferably selected from the commercial vanadium or copper or iron zeolite formulations is placed downstream of the AIG 38 at a suitable distance from the AIG 38 to allow mixing of the ammonia gas in the exhaust gas 20 prior to reaching the catalyst 44. The catalyst 44 causes a reaction of ammonia with NOx in the exhaust gas 20 resulting in the conversion of NOx to elemental nitrogen across the catalyst 44. NOx emissions after the catalyst 44 will generally be below 25 ppm and typically are less than 10 ppm or even less than 5 ppm when firing natural gas.

A benefit of this approach is that only small quantities of safe urea reagent are needed for small boilers, the heat required for conversion of urea to ammonia is small and is taken from the enthalpy of the boiler 10 combustion gases, the residence time of any ammonia gas is short, and the urea injection rate is instantaneously matched to the demand rate without the need for intermediate storage of converted ammonia. The continuous flow of hot air through the reaction duct 18 vaporizes and decomposes the aqueous urea 32 and helps minimizes the plugging of the reaction duct 18 from any unconverted urea.

For instance, if the boiler 10 in FIG. 1 were an industrial water tube boiler firing natural gas with an exhaust gas flow of 67,500 pounds per hour at a furnace exhaust temperature of 603 F the baseline NOx emissions are approximately 30 ppm and require reduction to less than 5 ppm. A 2.5"-3" diameter hot duct 16 inserted through the boiler wall 22 and into the convective pass between the boiler tubes 46 where the exhaust gas 58 temperature in the furnace is in the range of 1800 F at the hot inlet end 48 of the hot duct 16 and the exhaust gas 60 is in the range of 600 F at the cold outlet end 50. The hot duct 16 runs longitudinally down the length of the convective zone 24 of the boiler 10 and the inlet to the hot duct 16 is located at the hot end 48 of the boiler 48 with the air flow through hot duct 16 running in the flow direction with the hot combustion gases and exiting near the cold end 50 of the convective zone 24. A blower 12 supplies ambient air at a rate of 150-250 scfm to the hot duct 16. Urea solution is injected into the reaction duct 18 at the rate of 0.5-0.6 gph to generate ammonia gas for introduction into the primary exhaust 40 through the AIG 38.

Figure 2:
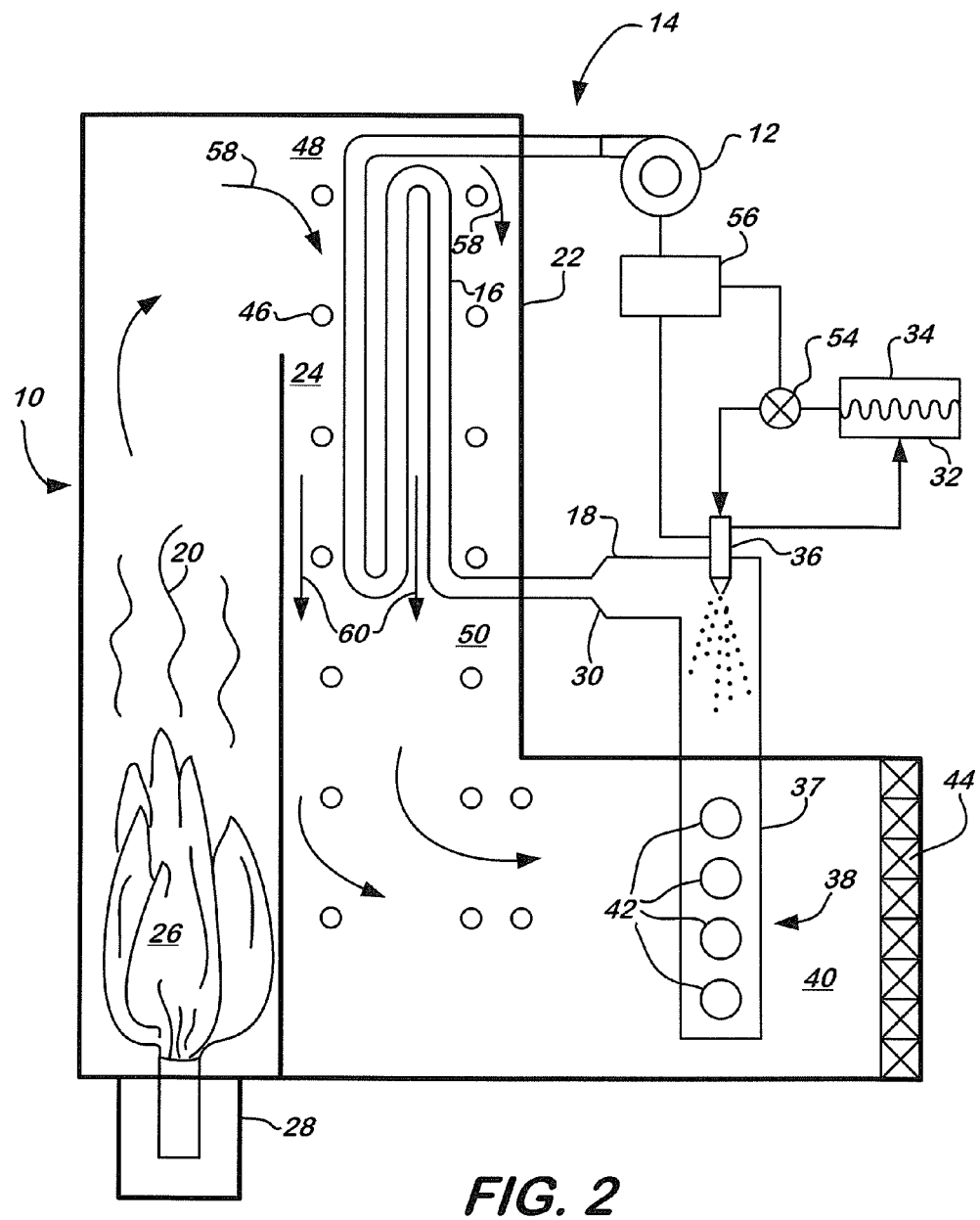
FIG. 2 is a schematic cross-sectional view of a first alternative embodiment of the present invention.

Alternatively, as shown in FIG. 2, the heat duct 16 can have two loops passing through the convective zone 24 for better heat transfer. The hot duct 16 runs longitudinally down the length of the convective zone 24 toward the cold end 50 of the boiler 10, loops back up toward the hot end 48 and then loops back down toward the cold end 50 where it exits the boiler wall 22.

Figure 3:
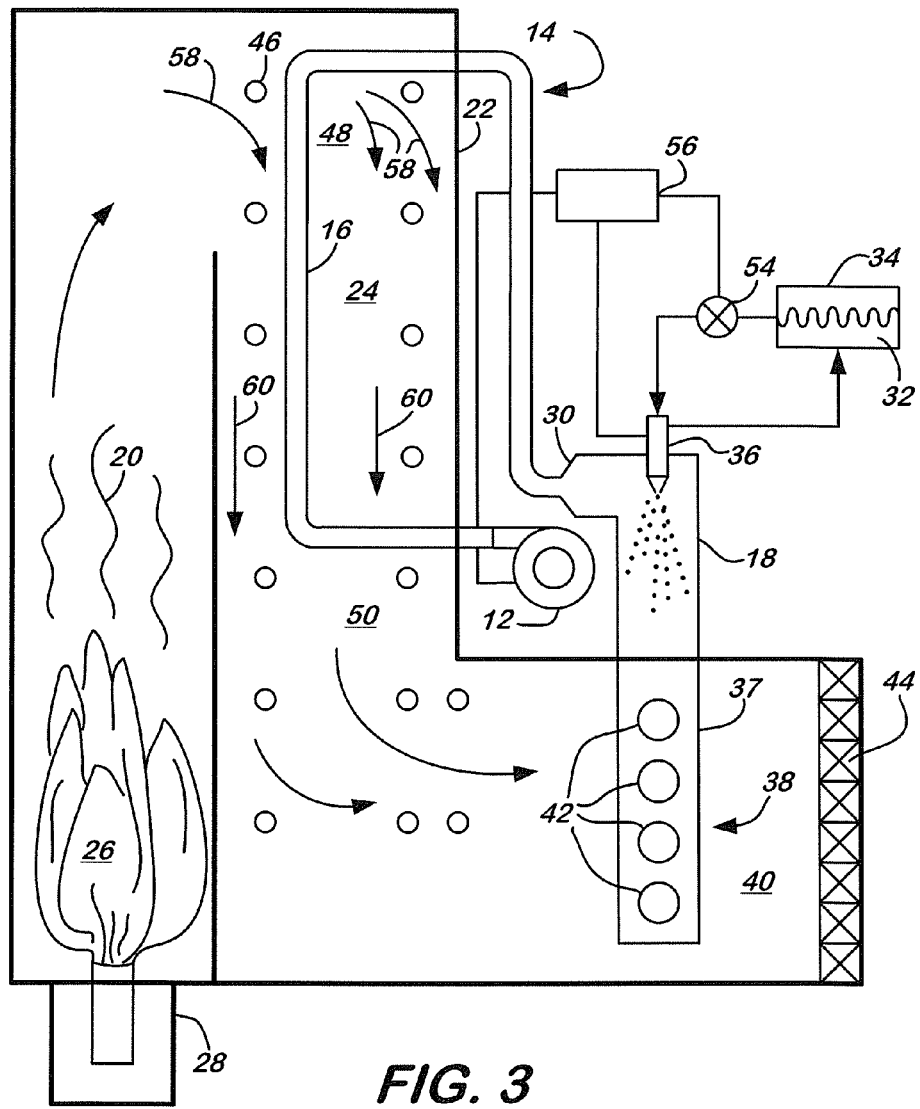
FIG. 3 is a schematic cross-sectional view of a second alternative embodiment of the present invention.

Still further, as shown in FIG. 3, the inlet to the hot duct 16 can be near the cold end 50 of the boiler 10 with air flow through the hot duct 16 running in a direction counter to the flow of combustion gases and exiting at the hot end 48 of the boiler 10.

Figure 4:
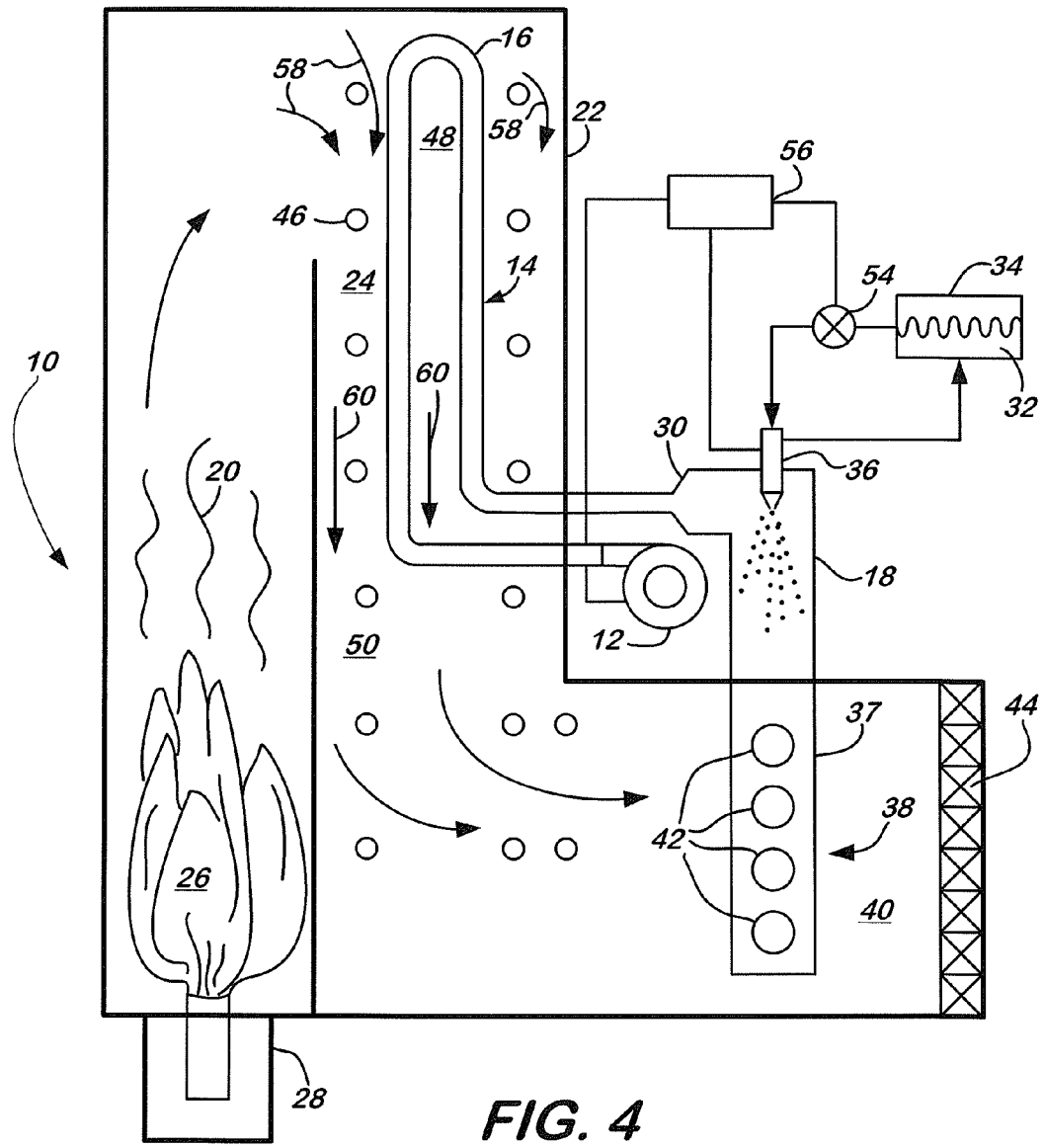
FIG. 4 is a schematic cross-sectional view of a third alternative embodiment of the present invention.

Still further, as shown in FIG. 4, the longitudinal hot duct 16 can be configured to enter and exit at the same end of the furnace to improve heat transfer to the flowing hot air in the heat duct 16. As shown in FIG. 4 the hot duct 16 is entering and exiting the cold end 50 of the convective zone 24. However, it should be under stood that the hot duct 16 could enter and exit the same area anywhere along the convective zone 24.

Figure 5:
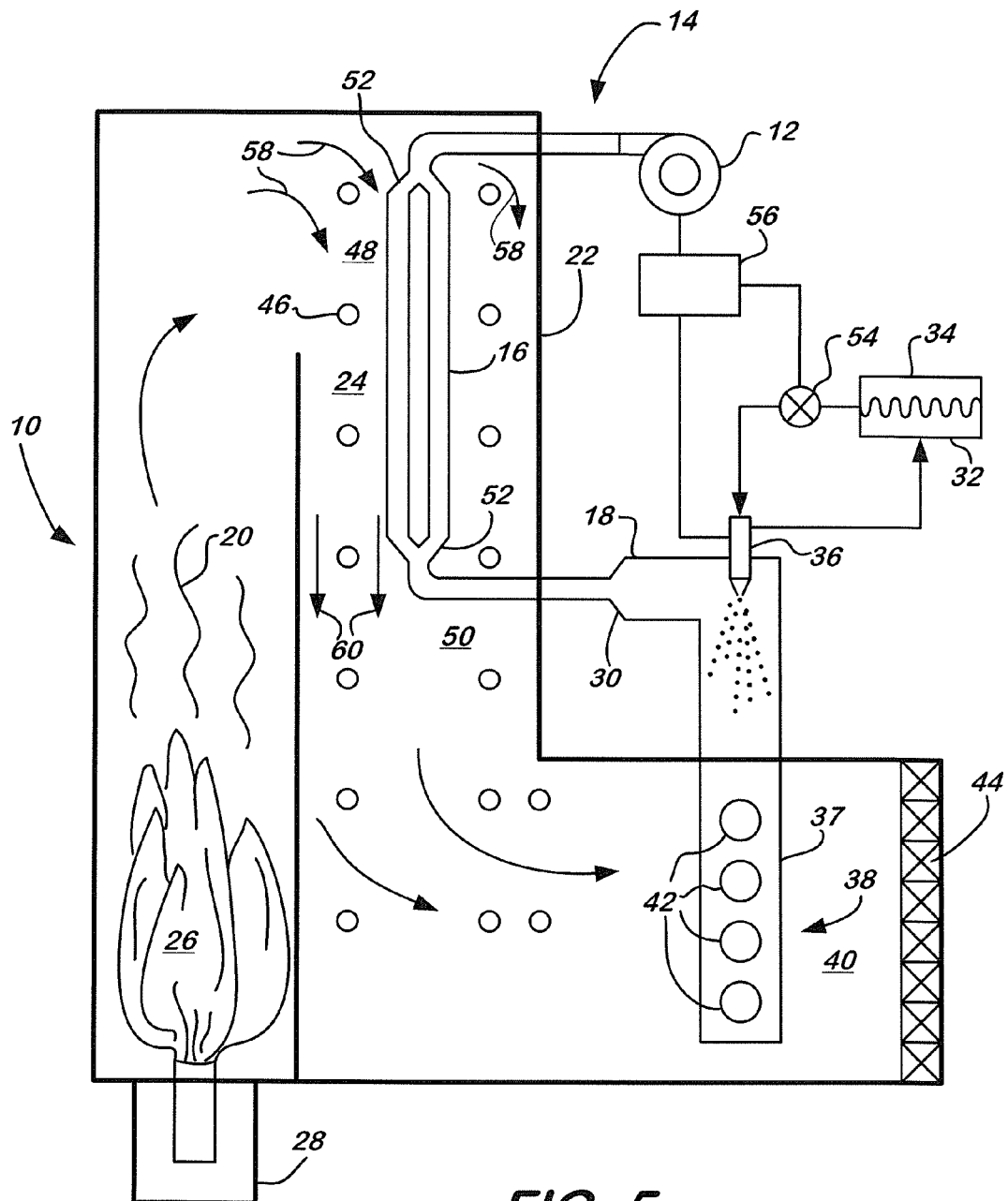
FIG. 5 is a schematic cross-sectional view of a fourth alternative embodiment of the present invention.

As another alternative, as shown in FIG. 5, two separate lengths of hot duct 16 can be connected to the fan or blower 12 using a t-connection 52 to increase the volume of heated air flowing to the reaction duct 18.

Figure 6:
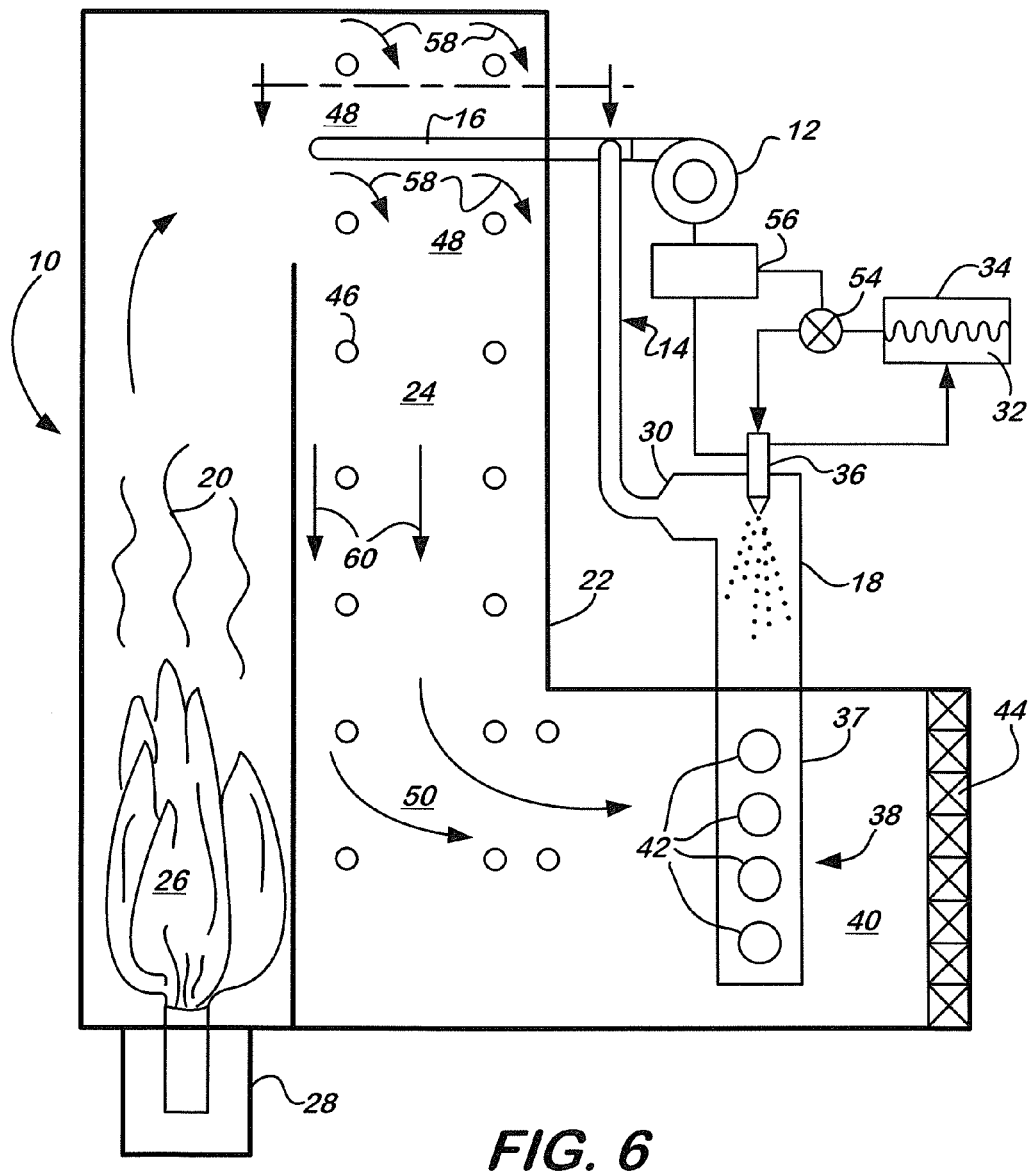
FIG. 6 is a schematic cross-sectional view of a fifth alternative embodiment of the present invention.
Figure 6A:
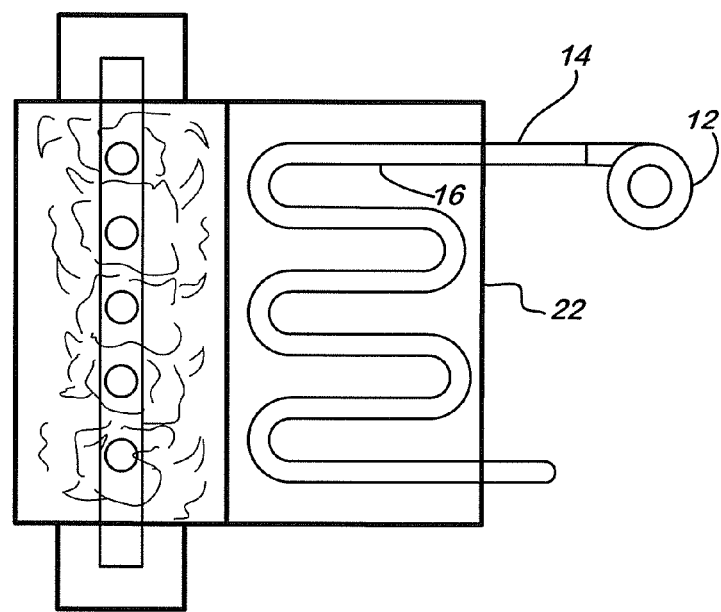
FIG. 6A is a schematic cross-sectional view through the line A-A of FIG. 6.

Still further, as shown in FIGS. 6 and 6A, the hot duct 16 can be configured as a heat exchanger style module of multiple loops with a hot duct 16 diameter less than the web dimension separating the boiler tubes 46; for example, less than 2" diameter. In this manner the heat exchanger module can easily be inserted through the boiler wall 22 between adjacent boiler tubes 46 and positioned perpendicular the hot gas flow with a minimum of boiler modifications. Alternatively, a larger diameter hot duct 16 can be used, typically 2-3" diameter, and boiler tubes 46 can be modified to accommodate the heat exchanger module.

When using a heat exchanger style module at a cross section of the furnace, the inlet end of the hot duct 16 will typically be at the bottom of the module and the outlet will be at the top of the module. The heat exchanger pipe exits the boiler wall in the same plane where it entered or it can be routed to a lower or higher temperature zone of the boiler before exiting the boiler wall.

In an alternative embodiment, air flow from the forced draft fan that supplies air under pressure to the burner, or exhaust gas from the flue gas recirculation fan, can be fed to the heat duct in lieu of air from the blower. Alternatively, it can be fed to the inlet of the blower as preheated air introduced to the inlet of the heat pipe.

Figure 7:
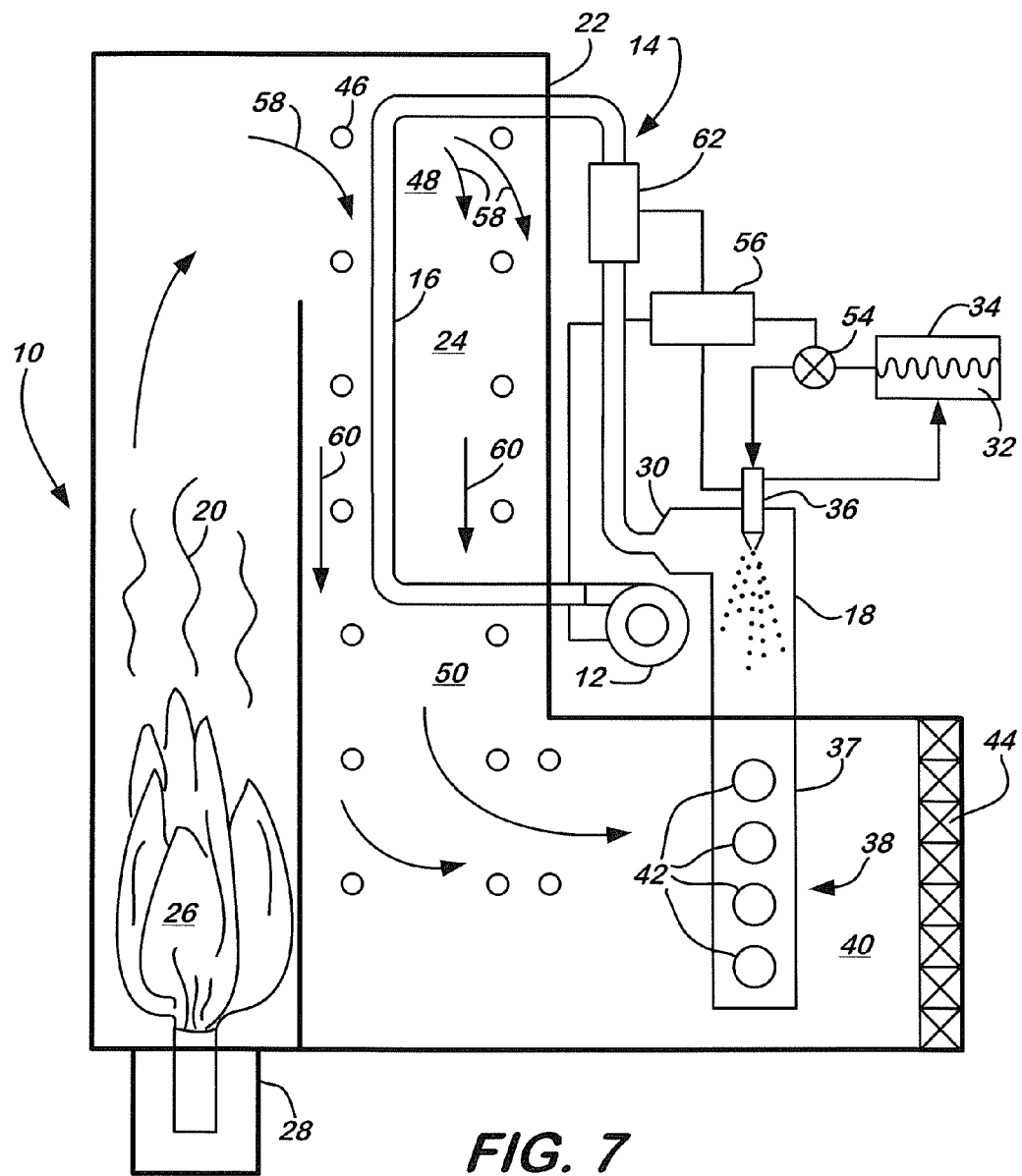
FIG. 7 is a schematic cross-sectional view of a sixth alternative embodiment of the present invention.

In yet another embodiment, as shown in FIG. 7, if the exhaust gas is not hot enough an electric heater 62 or duct burner 62 can be used to further heat the flowing hot air to the reaction duct 18 from the blower, preferably at a rate of 150 scfm or in the range of 100-350 scfm. The electric heater 62 or duct burner 62 can also be used to further heat air flow from the forced draft fan or alternatively gas flow from the flue gas recirculation (FGR) fan or FGR duct which can be routed to the reaction duct. Ambient air, exhaust gas or combustion air is ducted to the heater 62 or burner 62 and is heated to 650 F-750 F prior to the reaction duct 18 and urea solution is injected at the rate of 0.05 gph to 5 gph and preferably 0.3 gph to 1.5 gph to form ammonia gas in the reaction duct 18. The residence time in the reaction duct 18 is less than 0.6 seconds. The outlet of the reaction duct 18 is connected to an AIG header 37 or directly to the boiler exhaust gas duct upstream of an SCR catalyst 44 a mixer can be included in the exhaust duct 40. As an alternative to the burner 62, an electric heater or heat exchanger coil can be used to heat the air or flue gas entering the reaction duct 18.

While this disclosure is directed at NOx reduction from small industrial and commercial boilers it will be apparent that this invention will have application to other lean burn combustion sources including process heaters, furnaces, gas turbines, combustion turbines, internal combustion engines and utility boilers firing any ranger of gaseous, petroleum, solid fuels or biomass derived fuels.

What is claimed is:

1. A method for reducing NOx emissions from a lean burn combustion source, comprising the steps of:
providing an injection grid in a primary exhaust duct of a lean burn combustion source upstream of a NOx reduction catalyst;
providing a continuous duct between an air intake and the injection grid, the continuous duct having a hot portion and a reaction portion, the reaction portion connected to the injection grid;
passing air from the air intake through the continuous duct, at least a portion of the hot portion of the continuous duct positioned in a convective zone of the lean burn combustion source, the hot portion of the duct having a first average cross-sectional area perpendicular to the passing air, the hot portion of the duct supplying heated air to the reaction portion, the reaction portion having a second average cross-sectional area perpendicular to the passing air;

positioning at least one injector in the reaction portion;

supplying an aqueous solution of urea from a storage chamber to the at least one injector;

injecting the urea solution into the heated air in the reaction portion for evaporation and decomposition into ammonia gas;

supplying the ammonia gas to the injection grid;

injecting the ammonia gas into the exhaust duct; and wherein the second average cross-sectional area of the reaction portion of the duct is the same or greater than the first average cross-sectional area of the hot portion of the duct.

2. The method of claim 1, wherein the urea has a residence time of less than 1 second measured from when the urea solution is injected into the reaction portion of the duct to when the ammonia gas is injected into the primary exhaust duct.

3. The method of claim 1, wherein the urea has a residence time of less than 0.6 seconds measured from when the urea is injected into the reaction portion of the duct to when the ammonia gas is injected into the exhaust duct.

4. The method of claim 1, wherein the convective zone has a hot end and a cold end and the hot portion of the duct enters the convective zone at the hot end and exits the convective zone at the cold end.

5. The method of claim 1, wherein the convective zone has a hot end and a cold end and the hot portion of the duct enters and exits the convective zone at either the hot end or the cold end.

6. The method of claim 1, wherein the convective zone has a hot end and a cold end and the hot portion of the duct is looped through either the hot end or cold end.

7. The method of claim 1, wherein the hot portion of the duct enters and exits a position in the convective zone having a temperature between 700 and 1800 degrees Fahrenheit.

8. The method of claim 1, wherein the passing air in the hot portion of the duct is between 50 and 1500 standard cubic feet per minute.

9. The method of claim 1, wherein the passing air in the hot portion of the duct is between 150 and 300 standard cubic feet per minute.

10. The method of claim 1, wherein the heated air supplied to the reaction portion of the duct is between 450 and 1000 degrees Fahrenheit.

11. The method of claim 1, wherein the heated air supplied to the reaction portion of the duct is between 600 and 750 degrees Fahrenheit.

12. The method of claim 1, wherein the hot portion of the duct enters a first position in the convective zone having a temperature between 500 and 1800 degrees Fahrenheit and the hot portion of the duct exits a second position in the convective zone having a temperature between 500 and 1800 degrees Fahrenheit.

13. The method of claim 1, wherein the hot portion of the duct enters a first position in the convective zone having a temperature between 700 and 1600 degrees Fahrenheit and the hot portion of the duct exits a second position in the convective zone having a temperature between 700 and 1600 degrees Fahrenheit.

14. The method of claim 1, wherein the reaction portion of the duct is positioned outside the convection zone and the urea is injected into the reaction portion of the duct at a rate between 0.1 and 10 gallons/hour.

15. The method of claim 1, wherein the reaction portion of the duct is positioned outside the convection zone and the urea is injected into the reaction portion of the duct at a rate between 0.05 and 5 gallons/hour.

16. The method of claim 1, wherein the urea is injected into the reaction portion of the duct using a single fluid return flow solenoid actuated injector.

17. The method of claim 16, wherein the single fluid return flow solenoid actuated injector has air assistance for atomization.

18. The method of claim 1, wherein the hot portion of the duct has a diameter between 1 and 4 inches.

19. The method of claim 1, wherein the reaction portion of the duct has a diameter between 4 and 16 inches.

20. The method of claim 1, wherein a secondary heat source is positioned in the hot portion of the duct to further heat the passing air.

21. The method of claim 1, wherein the second average cross-sectional area of the reaction portion of the duct is no greater than six times the first average cross-sectional area of the hot portion of the duct.

22. The method of claim 1, wherein the second average cross-sectional area of the reaction portion of the duct is no greater than three times the first average cross-sectional area of the hot portion of the duct.

23. A method for reducing NOx emissions from a lean burn combustion source, comprising the steps of:

passing air through a continuous duct having a hot portion and a reaction portion, at least a portion of the hot portion of the duct positioned in a convective zone of a lean burn combustion source, the hot portion of the duct providing heated air to the reaction portion of the duct;

positioning at least one injector in the reaction portion;

supplying urea from a storage chamber to the at least one injector;

injecting the urea into the heated air in the reaction portion for evaporation and decomposition into ammonia gas;

providing an injection grid in an exhaust duct of the lean burn combustion source upstream of a NOx reduction catalyst, the injection grid connected to the reaction portion;

supplying the ammonia gas to the injection grid; and injecting the ammonia gas into the exhaust duct.

24. The method of claim 23, wherein the urea has a residence time of less than 1 second measured from when the urea solution is injected into the reaction portion of the duct to when the ammonia gas is injected into the primary exhaust duct.

25. The method of claim 23, wherein the urea has a residence time of less than 0.6 seconds measured from when the urea is injected into the reaction portion of the duct to when the ammonia gas is injected into the exhaust duct.

26. The method of claim 23, wherein the hot portion of the duct enters a first position in the convective zone having a temperature between 500 and 1800 degrees Fahrenheit and the hot portion of the duct exits a second position in the convective zone having a temperature between 500 and 1800 degrees Fahrenheit.

27. The method of claim 23, wherein the hot portion of the duct enters a first position in the convective zone having a temperature between 700 and 1600 degrees Fahrenheit and the hot portion of the duct exits a second position in the convective zone having a temperature between 700 and 1600 degrees Fahrenheit.

28. The method of claim 23, wherein the reaction portion of the duct is positioned outside the convection zone and the urea is injected into the reaction portion of the duct at a rate between 0.1 and 10 gallons/hour.

29. The method of claim 23, wherein the reaction portion of the duct is positioned outside the convection zone and the urea is injected into the reaction portion of the duct at a rate between 0.05 and 5 gallons/hour.

30. The method of claim 23, wherein the hot portion of the duct has a diameter between 1 and 4 inches.

31. The method of claim 23, wherein the reaction portion of the duct has a diameter between 4 and 16 inches.

32. A system for reducing NOx emissions from a lean burn combustion source, comprising:

a blower, the blower providing forced air through a continuous duct having a hot portion and a reaction portion, at least a portion of the hot portion of the duct positioned in a convective zone of a lean burn combustion source, at least one injector in the reaction portion;

a storage chamber for containing an aqueous urea solution, the storage chamber fluidly connected to the at least one injector;

a pump for transferring the urea solution from the storage chamber to the at least one injector;

at least one controller for controlling the blower, the pump and the at least one injector; and an injection grid in an exhaust duct of the lean burn combustion source upstream of a NOx reduction catalyst, the injection grid connected to the reaction portion of the duct.

33. The system of claim 32, wherein the hot portion of the duct has a first average cross-sectional area perpendicular to the forced air and the reaction portion of the duct has a second average cross-sectional area perpendicular to the forced air; and wherein the second average cross-sectional area of the reaction portion of the duct is the same or greater than the first average cross-sectional area of the hot portion of the duct.

* * * * *